No. 657,997. Patented Sept. 18, 1900.
W. H. WEBER.
WAGON REACH CLAMP.
(Application filed Mar. 21, 1900.)
(No Model.)
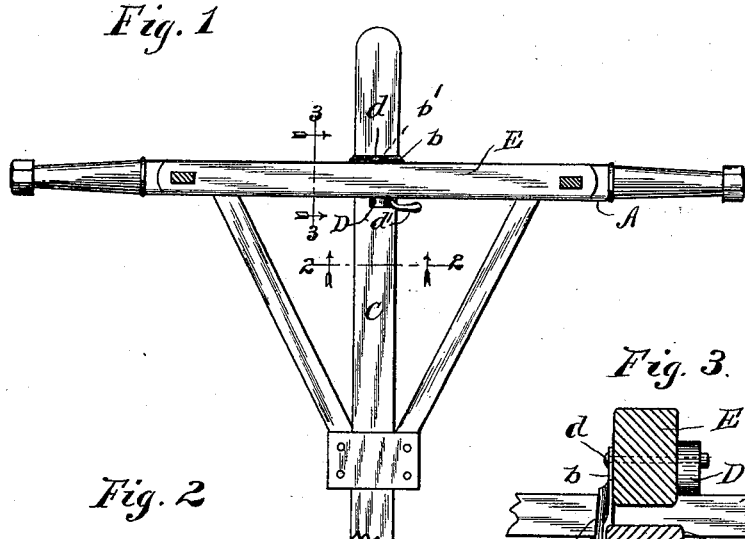
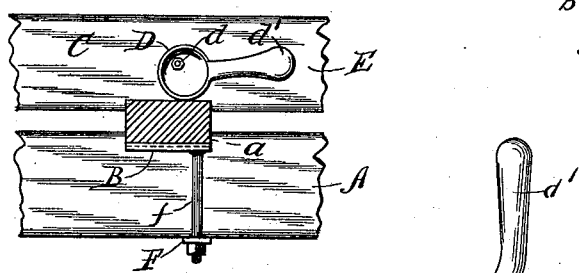
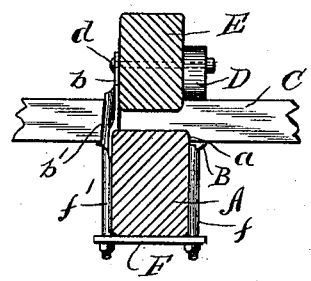
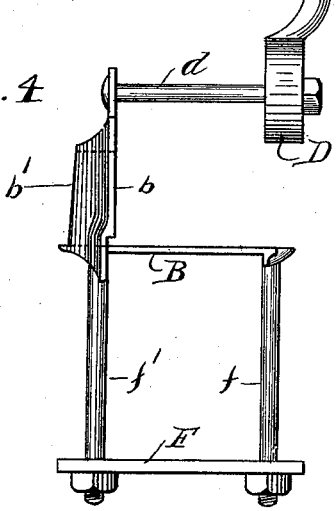
Witnesses:
J. D. McMahon.
J. Buehler.
Inventor,
William H Weber
By Glenn S. Noble
Atty.

UNITED STATES PATENT OFFICE.

WILLIAM H. WEBER, OF CHICAGO, ILLINOIS.

WAGON-REACH CLAMP.

SPECIFICATION forming part of Letters Patent No. 657,997, dated September 18, 1900.

Application filed March 21, 1900. Serial No. 9,630. (No model.)

*To all whom it may concern:*

Be it known that I, WILLIAM H. WEBER, a citizen of the United States, residing at Chicago, in the county of Cook and State of Illinois, have invented certain new and useful Improvements in Wagon-Reach Clamps, of which the following is a specification.

This invention relates to clamps for holding the reach of a wagon and joining the axle and bolster at the place where the reach passes between them, and has for its primary object to provide a clamp that will securely prevent the reach from vibrating and rattling in its socket, that will firmly unite the axle and bolster members and form a suitable socket for the reach to pass through, and that will be simple and inexpensive in construction and efficient in operation. Other objects and advantages will be more fully pointed out in the following description and claims.

In the drawings, Figure 1 is a plan view of the rear axle of a wagon, showing a portion of the reach in position with the clamp attached. Fig. 2 is a sectional view on the line 2 2 of Fig. 1 looking in the direction of the arrows, showing the clamp in elevation. Fig. 3 is a similar sectional view on the line 3 3 of Fig. 1 looking in the direction of the arrows. Fig. 4 is an elevation of the clamp and socket-plate removed.

A is the axle of a wagon, which is recessed, as at $a$, to receive a plate B, upon which the reach C rests. A vertical flange or member $b$, rising from the rear edge of the plate B and integral therewith, is provided with an opening $b'$, through which the reach extends. A bolt $d$ passes through a hole in the upper part of the flange $b$ and the bolster E and carries on the end an eccentric clamping-cam D, having a handle $d'$. Bolts $f$ and $f'$ pass through suitable lugs on the plate B and engage with a clip F, which passes across beneath the axle, and thereby furnish means for rigidly connecting the plate and axle. The reach C being in position, the handle of the eccentric is thrown over, which firmly clamps it in position, and the weight of the handle prevents any liability of the eccentric working loose.

It is well known that the vibration and hammering of the reach in the socket causes a large amount of wear on the axle, and thereby greatly weakens it. My invention is designed to prevent such vibration and wear, as well as stop the noise caused thereby, and it will be readily seen that the axle, bolster, and clamping-eccentric, being connected by means of the flanged plate B, form an exceedingly-rigid construction.

What I claim, and desire to secure by Letters Patent, is—

1. In a wagon-reach clamp, the combination of the axle, a flanged plate adapted to receive the reach, the bolster, and a cam adapted to bear against the reach.

2. In a wagon-reach clamp, the combination with the reach, of the bolster, a plate adapted to receive the reach, an eccentric cam adapted to bear against the reach and means for connecting said bolster, plate and cam.

3. In a wagon-reach clamp, the combination of the axle, the bolster, and an eccentric cam attached to said bolster and adapted to bear upon the reach.

4. In a wagon-reach clamp, the combination of the axle, a flanged plate adapted to receive the reach, a bolt passing through said flange and the bolster and provided with an eccentric cam adapted to bear upon the reach, and bolts passing through said plate to connect the axle therewith substantially as described.

WILLIAM H. WEBER.

Witnesses:
 THOS. D. MCMAHON,
 J. BUEHLER.